(12) United States Patent
Murata et al.

(10) Patent No.: US 7,737,609 B2
(45) Date of Patent: Jun. 15, 2010

(54) ULTRASONIC SENSOR

(75) Inventors: Koji Murata, Kusatsu (JP); Masato Kotani, Hakui (JP); Takaaki Asada, Moriyama (JP); Takayuki Shimamoto, Moriyama (JP); Hiroyuki Hirano, Inba-gun (JP); Mio Furuya, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 12/425,548

(22) Filed: Apr. 17, 2009

(65) Prior Publication Data
US 2009/0195123 A1 Aug. 6, 2009

Related U.S. Application Data

(63) Continuation of application No. PCT/JP2007/070049, filed on Oct. 15, 2007.

(30) Foreign Application Priority Data
Oct. 20, 2006 (JP) .............................. 2006-285700

(51) Int. Cl.
H01L 41/08 (2006.01)
H04R 17/00 (2006.01)

(52) U.S. Cl. ..................................... 310/348
(58) Field of Classification Search ................. 310/348
See application file for complete search history.

(56) References Cited

U.S. PATENT DOCUMENTS

| 4,556,814 | A  | * | 12/1985 | Ito et al. | ..................... | 310/334 |
| 6,466,513 | B1 | * | 10/2002 | Pabon et al. | ................... | 367/35 |
| 7,548,014 | B2 | * | 6/2009 | Asada et al. | ................. | 310/348 |
| 7,554,248 | B2 | * | 6/2009 | Oda et al. | ..................... | 310/348 |
| 7,587,806 | B2 | * | 9/2009 | Furukawa | ..................... | 29/594 |
| 2009/0218913 | A1 | * | 9/2009 | Hirano et al. | ............... | 310/326 |

(Continued)

FOREIGN PATENT DOCUMENTS

JP 59-76196 U 5/1984

(Continued)

OTHER PUBLICATIONS

Official Communication issued in International Patent Application No. PCT/JP2007/070049, mailed on Feb. 5, 2008.

*Primary Examiner*—J. SanMartin
(74) *Attorney, Agent, or Firm*—Keating & Bennett, LLP

(57) ABSTRACT

An ultrasonic sensor includes a cylindrical outer case with a bottom and a piezoelectric element fixed to the inner side of the bottom portion of the outer case. A ring-shaped inner case having a central hole extending in the axial direction in the central portion thereof is disposed inside the sidewall portion of the outer case. A flat or substantially flat portion is provided around the central hole of the inner case, and a viscoelastic filler is arranged so as to extend from the central hole to the flat or substantially flat portion of the inner case. A tabular member is disposed on the flat or substantially flat portion so as to face the flat or substantially flat portion with the filler interposed therebetween. When the inner case vibrates, shear deformation occurs in the filler interposed between the flat or substantially flat portion and the tabular member since the tabular member is not substantially deformed, and the vibration is reduced by the viscoelastic damping effect.

11 Claims, 10 Drawing Sheets

U.S. PATENT DOCUMENTS

2009/0302712 A1* 12/2009 Ota .......................... 310/334

FOREIGN PATENT DOCUMENTS

| | | | |
|---|---|---|---|
| JP | 61-112499 A | | 5/1986 |
| JP | 61-120599 A | | 6/1986 |
| JP | 61-120600 A | | 6/1986 |
| JP | 63-85998 U | | 6/1988 |
| JP | 02-036700 A | | 2/1990 |
| JP | 02-243100 A | | 9/1990 |
| JP | 11-187491 A | | 7/1999 |
| JP | 2000023296 A | * | 1/2000 |
| JP | 2000-152390 A | | 5/2000 |
| JP | 2002-58097 A | | 2/2002 |
| JP | 2002204497 A | * | 7/2002 |
| JP | 2002209294 A | * | 7/2002 |
| JP | 2004-146879 A | | 5/2004 |
| JP | 2004-343660 A | | 12/2004 |
| JP | 2006352829 A | * | 12/2006 |
| WO | WO 2007094184 A1 | * | 8/2007 |
| WO | WO 2007149002 A1 | * | 12/2007 |

* cited by examiner

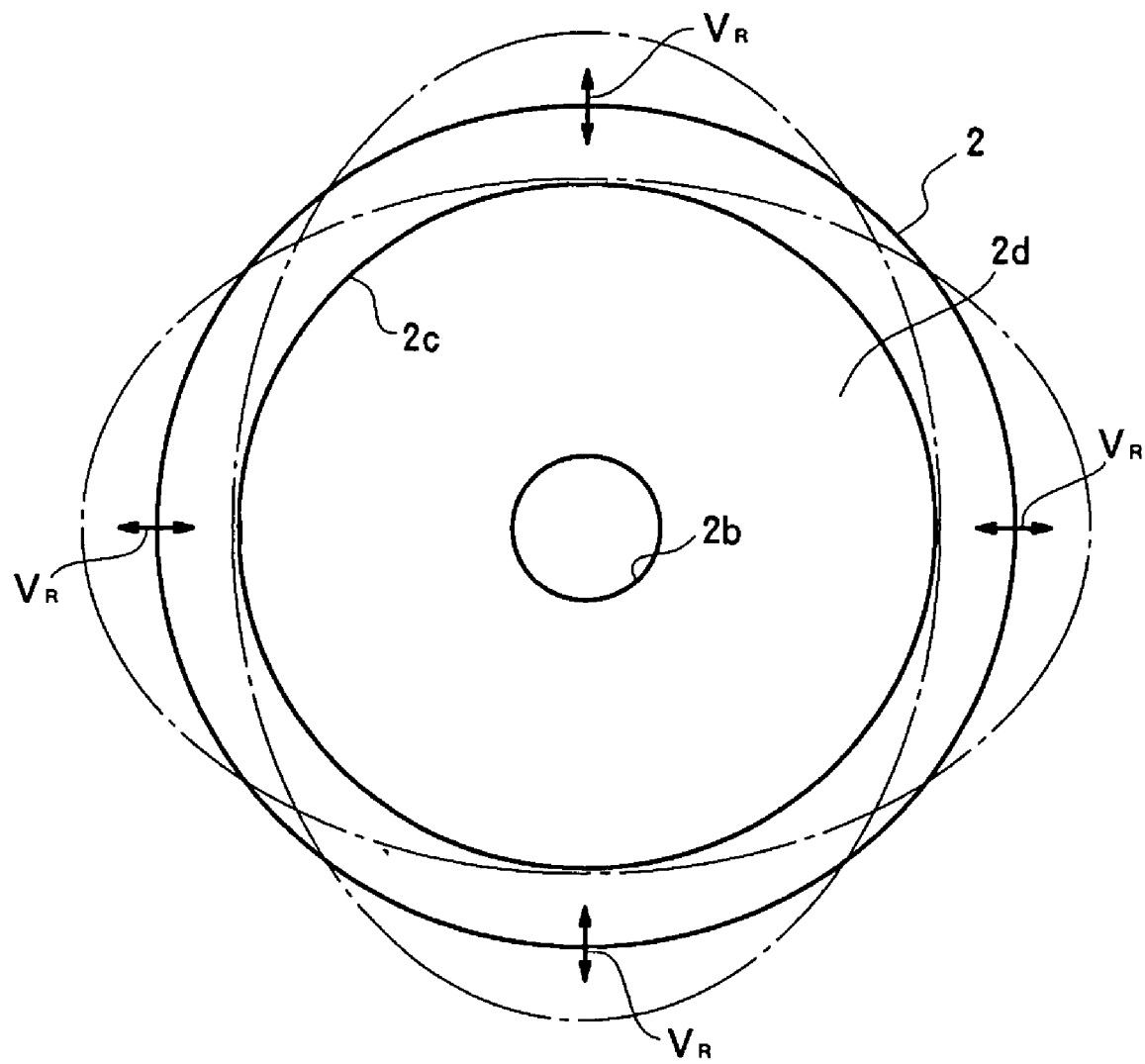

FIG. 5A
| THICKNESS OF TABULAR MEMBER (mm) | REVERBERATION TAIL (Vpp) | | | | |
|---|---|---|---|---|---|
| | Max | Average | Min | \|Max-Ave\| | \|Min-Ave\| |
| 1.6 | 0.065 | 0.054 | 0.047 | 0.011 | 0.007 |
| 1.2 | 0.091 | 0.077 | 0.069 | 0.014 | 0.008 |
| 0.9 | 0.212 | 0.133 | 0.082 | 0.079 | 0.051 |
| 0.6 | 0.359 | 0.203 | 0.133 | 0.157 | 0.070 |
| 0.0 | 1.430 | 1.019 | 0.666 | 0.411 | 0.353 |
FIG. 5B
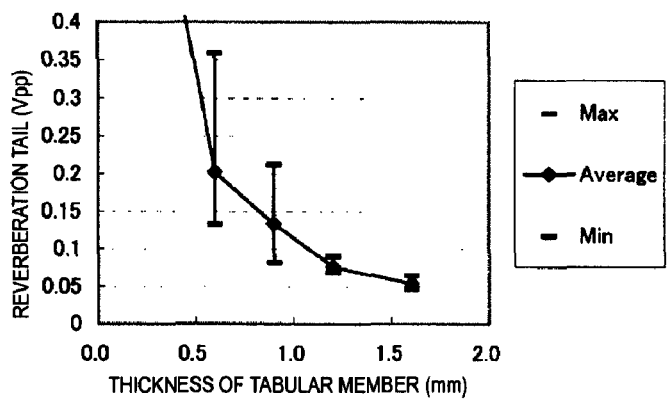
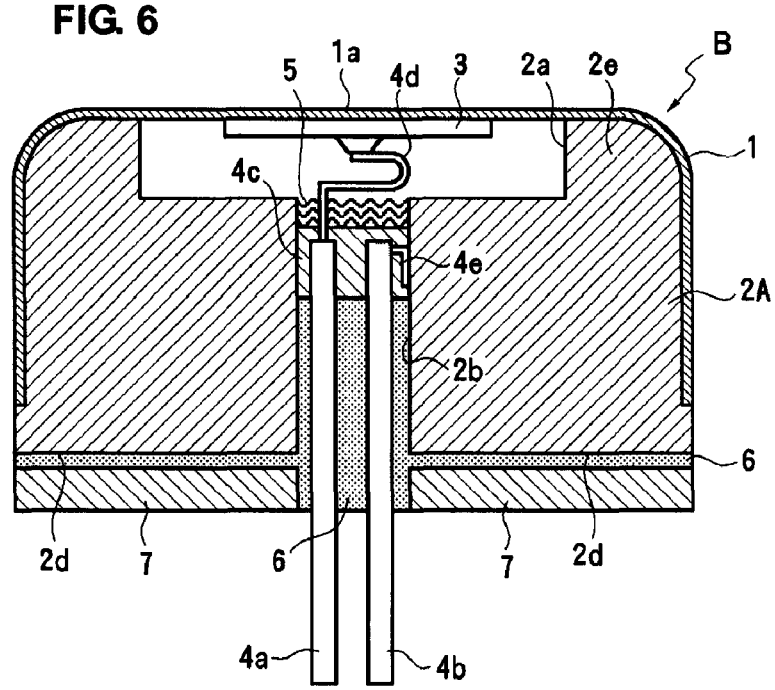
FIG. 6

ULTRASONIC SENSOR

BACKGROUND OF THE INVENTION

1. Field of the Invention

The present invention relates to ultrasonic sensors used as, for example, obstacle detection sensors, such as car-mounted rear sonar devices and corner sensors.

2. Description of the Related Art

Ultrasonic sensors capable of transmitting and receiving ultrasonic waves have been used as obstacle detection sensors, such as car-mounted rear sonar devices. As shown in FIG. 15, such an ultrasonic sensor includes a cylindrical case 100 with a bottom and a piezoelectric element 101 bonded to the inner side of the bottom portion, such that the bottom portion of the case 100 functions as a vibrating surface. A terminal holder 104 that holds metallic terminals 102 and 103 is fixed inside the case 100, and a viscoelastic filler 105 is disposed in a recessed portion formed by the terminal holder 104 and the sidewall of the case 100. A sound absorber 106 is disposed at the inner side (adjacent to the piezoelectric element) of the terminal holder 104. Spring terminals 107 and 108 are attached to the metallic terminals 102 and 103, respectively. The spring terminal 107 is in contact with an electrode on the rear surface of the piezoelectric element 101, and the spring terminal 107 is in contact with the inner surface of the case 100. When a voltage is applied to the piezoelectric element 101, the piezoelectric element 101 is induced to vibrate in radial directions or in the thickness direction thereof, and the vibrating surface of the case 100 vibrates so as to emit ultrasonic waves into the air. Once the case 100 resonates, the vibration continues to some extent even when electrical signals to the piezoelectric element 101 are cut off. This phenomenon is referred to as reverberation. When the reverberation continues for a long period of time, sound waves reflected from target objects cannot be accurately detected because the sound waves are hidden in the reverberation signals, and a resolution of minimum distances to detected obstacles cannot be improved.

To reduce the reverberation, Japanese Unexamined Patent Application Publication No. 2004-146879 discloses a method for reducing variations in reverberation characteristics by setting the hardness of a sealing silicone resin disposed inside a case in a predetermined range. However, the physical properties of such a hardened body of silicone resin vary widely, and it is difficult to reduce variations among manufactured products. Therefore, it is very difficult to control the manufacturing process, and the reverberation characteristics may in fact be impaired and the characteristics may vary more widely when the manufacturing process is not closely controlled.

Japanese Unexamined Patent Application Publication No. 2-36700 discloses an ultrasonic sensor that reduces residual vibration by providing a vibration isolator on a piezoelectric element and the entire inner surface of a cylindrical case and by providing an elastic member inside the cylindrical case so as to prevent resonance of the air inside the case. In this structure, a terminal plate is fixed to an opening of the cylindrical case, and the case and the terminal plate vibrate in an integrated manner. Thus, the vibration of the side surface of the case cannot be sufficiently reduced, and the reverberation cannot be sufficiently reduced.

Japanese Unexamined Patent Application Publication No. 2004-343660 discloses an ultrasonic sensor including a cylindrical case with a bottom, the sidewall portion of the case having a double structure including an inner peripheral wall and an outer peripheral wall, and an elastic body enclosed in a hollow portion between the inner peripheral wall and the outer peripheral wall. This ultrasonic sensor has an effect of preventing vibration of the sidewall portion of the case causing reverberation from being amplified by reducing mutual interference between the vibration of a bumper of a vehicle body and the vibration of the sidewall portion of the case causing reverberation using a damping effect of the elastic body enclosed in the hollow portion of the sidewall portion of the case. However, the ultrasonic sensor cannot effectively reduce the vibration transmitted to the sidewall portion of the case and causing reverberation itself.

SUMMARY OF THE INVENTION

To overcome the problems described above, preferred embodiments of the present invention provide an ultrasonic sensor capable of damping unwanted vibration of a sidewall portion of a case, reducing the reverberation time, and improving the resolution of a minimum distance to a detected obstacle.

A preferred embodiment of the present invention provides an ultrasonic sensor having a cylindrical case with a bottom and a piezoelectric element fixed to the inner side of the bottom portion, the bottom portion defining a vibrating surface, including a ring-shaped inner support disposed inside the sidewall portion of the case, having a central hole extending in the axial direction at the central portion of the support, and having a flat or substantially flat portion around the central hole, a viscoelastic filler disposed inside the central hole and on the flat or substantially flat portion of the inner support, and a tabular member having a rigidity greater than that of the filler and disposed on the flat portion of the inner support so as to face the flat or substantially flat portion with the filler interposed therebetween.

In order to efficiently perform mechanical damping of vibrational energy remaining inside the case as reverberation, it is necessary to increase dissipation of the vibrational energy. Dissipation of energy can be roughly classified into two types, that is, material damping in which the energy is dissipated inside a structure and converted into thermal energy and viscosity damping in which the vibrational energy escapes to the exterior through intermediate substances by, for example, friction generated between joints of structural components. Material damping has been widely used in existing structures, and can provide an effect by selecting a filler having, for example, a high damping performance. However, no effective technique has been used for viscosity damping. Viscosity damping is a method to efficiently dissipate energy by generating moderate shear deformation and shear force. According to preferred embodiments of the present invention, vibration that causes reverberation can be damped by the viscoelastic damping effect of the viscoelastic filler.

The shear deformation of the filler will now be described in more detail. The vibration of the piezoelectric element is transmitted to the case, and the case vibrates in response to the reverberation. With this, the inner support provided for the sidewall portion of the case also vibrates. Broadly speaking, the inner support vibrates in the axial direction and in radial directions thereof, and vibrations in these directions are generated while acting on each other. Herein, the vibration in the axial direction can be damped to some extent by the vibration reducing effect of the inner support itself and the material damping of the filler disposed in the central hole and on the flat portion of the inner support. However, the vibration in the radial directions cannot be sufficiently damped by the inner support itself or the filler disposed in the central hole. According to preferred embodiments of the present invention, the tabular member is disposed on the flat or substantially flat portion of the inner support so as to face the flat or substantially flat portion with the filler interposed therebetween, and the deformation of the tabular member in the radial directions is small as compared to that of the flat or substantially flat portion when the inner support vibrates in the radial directions. Therefore, relative displacement occurs between the vibrating flat or substantially flat portion and the substantially still tabular member, and shear deformation occurs in the filler disposed therebetween. The vibrational energy can be efficiently dissipated by the viscoelastic damping effect caused by the shear deformation of the filler, and the vibration that causes reverberation can be reduced. Although the inner support can vibrate in directions other than the axial direction and the radial directions, the viscoelastic damping effect caused by the shear deformation of the filler operates on at least vibrational components in the radial directions of the vibration.

In order to obtain the shear deformation effect, it is necessary for the tabular member to be made of a material with a rigidity greater than that of the filler. When the rigidity is relatively high, changes in dimensions caused by bending force or torsional force are relatively small. Physical properties that indicate deformation difficulty include modulus of elasticity. The modulus of elasticity is a generic name for Young's modulus and modulus of rigidity, and a material with a high modulus of elasticity generally has a high rigidity. In order to generate shear deformation in the filler, the tabular member must be made of a material with a rigidity greater than that of the filler since it is necessary to generate shear strain in the filler by configuring the tabular member so as to be deformed as little as possible in response to the deformation of the filler when the inner support vibrates. The tabular member is preferably a plate made of a material with a high rigidity, such as metal, for example. The side shapes of the tabular member of preferred embodiments of the present invention are not specified as long as the tabular member has a surface facing the flat or substantially flat portion of the inner support. Moreover, the tabular member can be thin or thick in the axial direction thereof. Furthermore, when a thin metallic plate, such as a metallic washer, for example, is used as the tabular member, an increase in the height of the ultrasonic sensor can be prevented.

Viscosity damping is provided by the shear modulus which serves as a parameter that determines shear characteristics of the filler and the thickness of a viscoelastic body. Moreover, the degree of shear deformation of the viscoelastic body is affected by the areas of the flat or substantially flat portion and the tabular member facing each other and the physical properties (for example, Young's modulus, modulus of rigidity, density, and resonant frequency), and is also affected by modes of vibration (wavelengths). Therefore, in order to effectively reduce the vibration that causes reverberation, the type and the thickness of the viscoelastic body, the shapes of the flat or substantially flat portion and the tabular member, and the physical properties should be optimized in accordance with the frequencies and the amplitudes of the vibration. The use of viscosity damping in this manner achieves an ultrasonic sensor having the characteristics of an excellent damping function and mechanical damping function as compared to a sensor whose reverberation characteristics only depend on the existing material damping caused by the viscoelastic body.

According to a preferred embodiment of the present invention, the flat or substantially flat portion is preferably a surface parallel or substantially parallel to the bottom portion of the case. The flat or substantially flat portion is not necessarily parallel or substantially parallel to the bottom portion of the case. However, when the inner support vibrates in this case, the flat or substantially flat portion vibrates parallel or substantially parallel to the surface, and shear strain can be effectively generated in the filler disposed between the flat or substantially portion and the tabular member.

According to another preferred embodiment of the present invention, the case may preferably include a cylindrical outer case with a bottom and an inner case joined and fixed inside the outer case, and the inner support can be provided in the inner case. When the case includes separate outer and inner cases, the side vibration of the outer case can be damped more effectively. Moreover, the materials and the shapes of the case members can be selected in accordance with the corresponding requirements, and the case members can be produced at low cost.

According to another preferred preferred embodiment of the present invention, when the case includes separate outer and inner cases, the inner case can preferably be made of a metallic material with a density greater than that of the outer case. The material with a high density refers to a material with a high acoustic impedance, and such a material does not vibrate easily. Thus, when the inner case is made of a material with a high acoustic impedance, the leakage of the vibrational energy to the side surface of the outer case can be reduced, and the reverberation can be reduced. In addition, sound pressure of the ultrasonic waves to be emitted can be increased.

According to another preferred embodiment of the present invention, a recessed portion can preferably be provided in an end of the inner support opposite to the end adjacent to the piezoelectric element, the flat or substantially flat portion can preferably be disposed at the bottom surface of the recessed portion, and the tabular member can preferably be accommodated in the recessed portion. Since the tabular member can be accommodated in the recessed portion of the inner support adjacent to the rear side in this case, the tabular member can be easily positioned, and does not protrude outside the case.

According to another preferred embodiment of the present invention, only the flat or substantially flat portion may preferably be provided at the end of the inner support opposite to that adjacent to the piezoelectric element, and the shape of the outer periphery of the tabular member can be substantially the same as that of the inner support. Since the area of the tabular member and that of the flat or substantially flat portion facing the tabular member can be increased in this case, the shear deformation can act on the filler more effectively, and the vibration damping effect can be improved.

According to another preferred embodiment of the present invention, a through-hole corresponding to the central hole of the inner support can preferably be provided in the central portion of the tabular member, and a connecting terminal connected to the piezoelectric element can preferably extend to the exterior through the central hole of the inner support and the through-hole of the tabular member in a non-contact manner. Since the connecting terminal can extend to the exterior without being in contact with the inner support and the tabular member in this case, the vibration is prevented from being transmitted through the terminal, and the reverberation reducing effect can be improved. Herein, the connecting terminal can be a metallic terminal, or can be a lead wire.

According to another preferred embodiment of the present invention, the inner support can preferably be integrated into the inner side of the sidewall portion of the case. Since the bottom portion defining the vibrating surface and the sidewall portion are integrated together in this case, the case can be easily manufactured. Such a case can preferably be manufactured by known methods, for example, casting (including die casting), cutting, and forging.

According to preferred embodiments of the present invention, a ring-shaped inner support is disposed inside a sidewall portion of a cylindrical case with a bottom, and a viscoelastic filler is disposed in a central hole of the inner support. With this arrangement, the vibrational energy can be damped by the material damping caused by the viscoelastic body and the inner support. Moreover, since a tabular member is disposed on a flat or substantially flat portion provided in the inner support so as to face the flat or substantially flat portion with the filler interposed therebetween, the side vibration of the case can be damped by the viscoelastic damping caused by the shear deformation occurring in the filler interposed between the inner support and the tabular member. As a result, an ultrasonic sensor capable of effectively reducing the vibration remaining on the case and causing reverberation and having an excellent resolution of a minimum distance to a detected obstacle can be realized.

Other features, elements, steps, characteristics and advantages of the present invention will become more apparent from the following detailed description of preferred embodiments of the present invention with reference to the attached drawings.

BRIEF DESCRIPTION OF THE DRAWINGS

FIG. 3 is a bottom view illustrating side vibrations of an inner case (inner support) shown in FIG. 1.

FIGS. 5A and 5B are a table and a diagram, respectively, illustrating the relationship between the thickness of the tabular member and the reverberation tail.

FIG. 6 is a cross-sectional view of an ultrasonic sensor according to another preferred embodiment of the present invention.

DETAILED DESCRIPTION OF PREFERRED EMBODIMENTS

Preferred embodiments of the present invention will now be described with reference to the drawings.

First Preferred Embodiment

Figure 1:
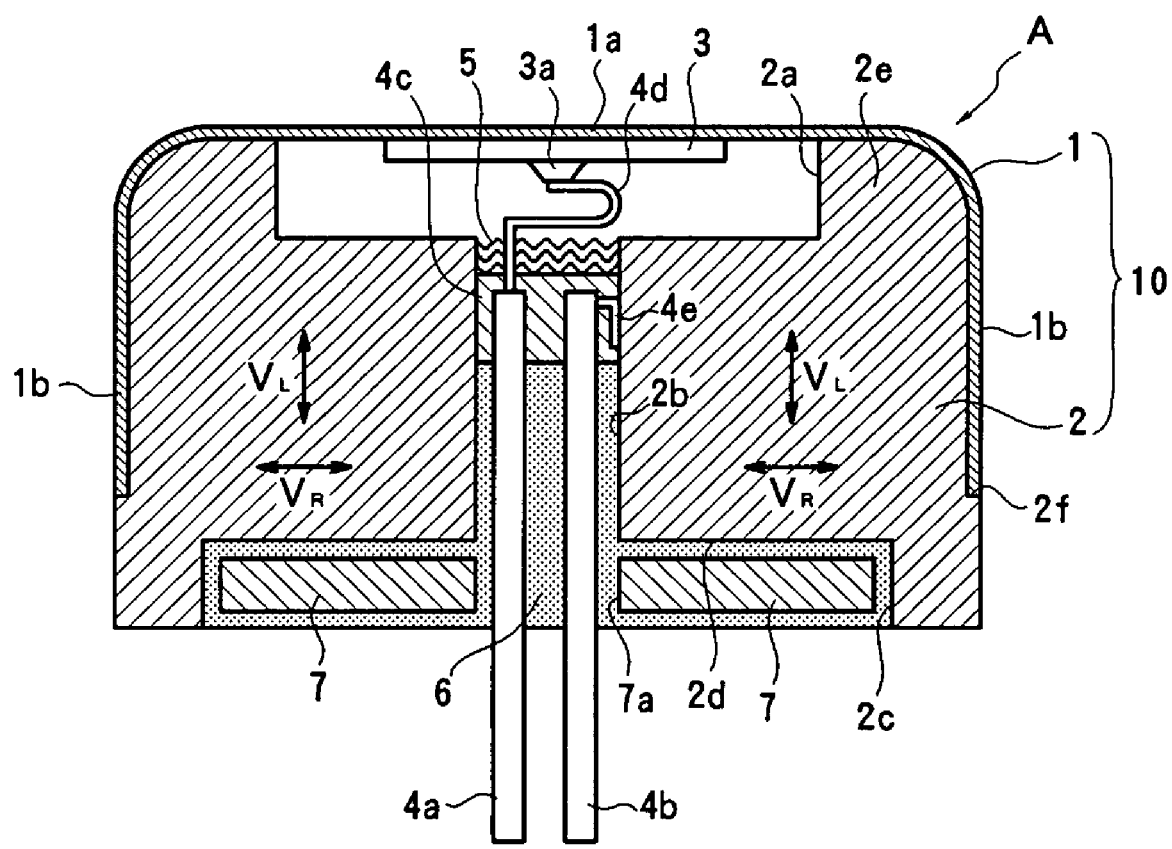
FIG. 1 is a cross-sectional view of an ultrasonic sensor of Example 1 according to a preferred embodiment of the present invention.
Figure 2:
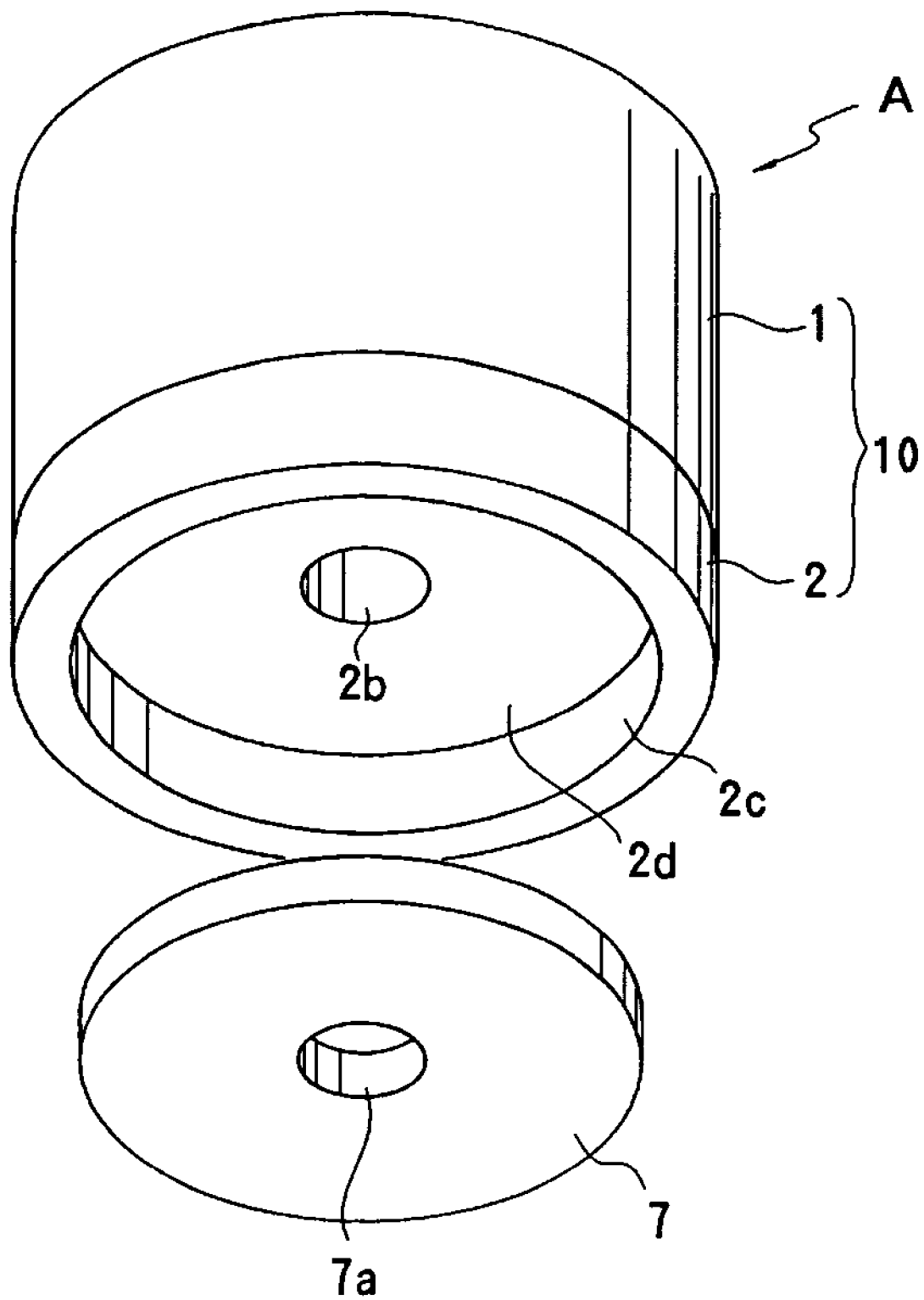
FIG. 2 is an exploded perspective view of a body of the ultrasonic sensor and a tabular member shown in FIG. 1.

FIGS. 1 and 2 illustrate an ultrasonic sensor according to a first preferred embodiment of the present invention. This ultrasonic sensor A includes an outer case 1, an inner case 2, a piezoelectric element 3, metallic terminals 4a and 4b, a sound wave absorber 5, a filler 6, and a tabular member 7.

The outer case 1 is formed by pressing a metal plate so as to have a cylindrical shape with a bottom (preferably U-shaped when viewed in section), and the disc-shaped piezoelectric element 3 is bonded to the inner side of a bottom portion 1a of the outer case so as to define a unimorph cell. The piezoelectric element 3 includes a piezoelectric ceramic plate and electrodes provided on the top and bottom surfaces of the piezoelectric ceramic plate, and vibrates in radial directions or in the thickness direction thereof when a voltage is applied between the electrodes. The outer case 1 includes a cylindrical sidewall portion 1b with an opening at a location adjacent to the rear side. The outer case 1 is preferably made of a material with a low acoustic impedance, that is, a metallic material that can vibrate easily. Electrodes (not shown) are provided on a first surface of the piezoelectric element 3, the first surface being in contact with the bottom portion 1a, and on a second surface that is opposite to the first surface.

The inner case 2 is connected and fixed inside the sidewall portion 1b of the outer case 1 having the opening, and the outer case 1 and the inner case 2 define a case 10. The inner case 2 defines an example of an inner support, and is preferably made of a metallic material so as to have a substantially annular or cylindrical shape with a thickness greater than that of the outer case 1. The inner case 2 has, for example, a function of controlling the directivity of ultrasonic waves emitted from the outer case 1 and a function of damping side vibration transmitted from the outer case 1. The inner case 2 is preferably made of a metallic material having an acoustic impedance greater than that of the outer case 1, that is, a metallic material that does not vibrate easily. The inner case 2 includes a recessed portion 2a that defines a vibrating space in a central portion thereof adjacent to the front side facing the piezoelectric element 3, and a peripheral wall portion 2e of the recessed portion 2a is in close contact with the outer peripheral portion of the bottom portion 1a of the outer case 1. The shape and depth of the recessed portion 2a are set in accordance with the directivity of ultrasonic waves of the ultrasonic sensor A. The inner case 2 has a central hole 2b that passes therethrough in the axial direction in the central portion thereof. In this preferred embodiment, the inner diameter of the central hole 2b is preferably less than the outer diameter of the piezoelectric element 3. However, the inner diameter of the central hole can be greater than the outer diameter of the piezoelectric element 3. The inner case 2 includes a recessed portion 2c surrounding the central hole 2b at an end of the inner case opposite to that adjacent to the piezoelectric element 3 (adjacent to the rear side), and a flat or substantially flat portion 2*d* is provided at the bottom surface of the recessed portion 2*c*. This flat or substantially flat portion 2*d* is parallel or substantially parallel to the bottom portion 1*a* which defines a vibrating surface. The inner case 2 includes a step 2*f* preferably having a thickness corresponding or substantially corresponding to the thickness of the outer case 1 at the outer peripheral portion of the inner case, and the end of the opening of the outer case 1 is in contact with the step. In this preferred embodiment, the rear portion of the inner case 2 protrudes from the end of the opening of the outer case 1 to the exterior. However, the rear portion of the inner case 2 and the end of the opening of the outer case 1 can be in the same or substantially the same plane.

In order to reduce residual vibration of the sidewall portion 1*b* of the outer case 1, the inner case 2 that vibrates together with the sidewall portion and conductive members, and to reduce resonance of the air in the vicinity of the piezoelectric element 3, the sound wave absorber 5 such as a sponge, for example, is preferably arranged at the end of the central hole 2*b* of the inner case 2 adjacent to the piezoelectric element. The sound wave absorber 5 in this preferred embodiment is preferably disposed inside the central hole 2*b*. However, the sound wave absorber can be disposed in the vibrating space, that is, in the recessed portion 2*a*. A resin terminal holder 4*c* that holds the pair of metallic terminals 4*a* and 4*b* is disposed in the central hole 2*b* behind the sound wave absorber 5. The viscoelastic filler 6 is disposed in the central hole 2*b* behind the terminal holder 4*c* so as to seal the vibrating space. The filler 6 can preferably be made of a viscoelastic material, such as silicone resin, urethane resin, and butyl rubber, for example. The filler 6 is arranged so as to continuously extend from the central hole 2*b* to the recessed portion 2*c*.

A spring terminal 4*d* is disposed at an end of the metallic terminal 4*a*. The spring terminal 4*d* is in contact with and is electrically connected to a conductive portion 3*a* preferably made of, for example, solder or an electrically conductive adhesive provided on the electrode surface of the piezoelectric element 3 adjacent to the rear side. In this preferred embodiment, the vibration of the piezoelectric element 3 is not easily transmitted to the metallic terminal 4*a* since the spring terminal 4*d* is curved so as to preferably have a U shape. The metallic terminal 4*b* is in contact with and is electrically connected to the inner surface of the central hole 2*b* of the inner case 2 via a spring terminal 4*e*. Since the inner case 2 and the outer case 1 are preferably made of conductive materials, the spring terminal 4*e* is electrically connected to the electrode on the surface of the piezoelectric element 3 adjacent to the front side via the inner case 2 and the outer case 1. Since the metallic terminals 4*a* and 4*b* are held by the filler 6 at the peripheries thereof, the vibration is prevented from leaking to the exterior via the metallic terminals 4*a* and 4*b*.

The tabular member 7 is accommodated in the recessed portion 2*c* of the inner case 2 adjacent to the rear side, and is embedded in the filler 6. That is, the entire tabular member 7 is preferably covered with the filler 6. The flat or substantially flat portion 2*d* parallel or substantially parallel to the bottom portion 1*a* defining the vibrating surface is provided at the bottom surface of the recessed portion 2*c* as described above. The flat or substantially flat portion 2*d* and the tabular member 7 face parallel or substantially parallel to each other, and the filler 6 is interposed therebetween. The tabular member 7 has a through-hole 7*a* at the central portion thereof, and the metallic terminals 4*a* and 4*b* extend to the exterior via the central hole 2*b* of the inner case 2 and the through-hole 7*a* of the tabular member 7 in a non-contact manner. The tabular member 7 is a plate preferably made of a material with a rigidity greater than at least that of the filler 6, and can be, for example, a metallic plate, a ceramic plate, or a rigid resin plate. Herein, a ring-shaped metallic washer is used.

Next, the vibration damping provided by the filler 6 and the tabular member 7 will be described. When a voltage is applied to the piezoelectric element 3, the piezoelectric element 3 is induced to vibrate in the radial directions or in the thickness direction thereof, and the bottom portion 1*a* of the outer case 1 defining the vibrating surface vibrates so as to emit ultrasonic waves into the air. Once the outer case 1 resonates, the vibration continues to some extent even when electrical signals to the piezoelectric element 3 are cut off, and is transmitted to the inner case 2 via the sidewall portion 1*b* of the outer case 1. The vibration transmitted to the inner case 2 can be roughly classified into vibration $V_L$ in the axial direction and vibration $V_R$ in radial directions (see FIG. 1). The vibration $V_L$ in the axial direction tends to be damped by the material damping effect of the viscoelastic filler 6 or the damping effect of the inner case 2. The vibration $V_R$ in the radial directions can include a mode in which an ellipse when viewed as a whole is formed by inward deformation of the inner case 2 at two locations facing each other in a radial direction during outward deformation of the inner case at two other locations whose phases are shifted by 90° from those at the two above-described locations, the deformations occurring alternately, and a mode in which the entire inner case is expanded or contracted in the radial directions as shown in FIG. 3. On the other hand, the tabular member 7 arranged so as to face the flat or substantially flat portion 2*d* of the inner case 2 with the filler 6 interposed therebetween is deformed as little as possible in the radial directions. That is, since the tabular member 7 is not substantially deformed in response to the deformation of the inner case 2 in the radial directions as shown in FIG. 3, shear deformation occurs in the filler 6 interposed between the inner case 2 and the tabular member 7. As a result, the viscoelastic damping effect caused by the shear deformation occurring inside the filler 6 can effectively dissipate primarily the vibration $V_R$ of the inner case 2 in the radial directions.

Since the tabular member 7 is held by the inner case 2 via the filler 6 in a non-contact manner, another effect that is different from that described above is provided. That is, when the ultrasonic sensor A is installed in, for example, a car-mounted device, external vibration, such as vibration of a vehicle body, is transmitted to the ultrasonic sensor A. Such external vibration is damped by the filler 6 disposed in the inner case 2. However, a portion of the vibration is transmitted to the piezoelectric element 3, and is sometimes detected as error signals. To solve this, the tabular member 7 is disposed in the inner case 2 via the filler 6 so as to be relatively deformable such that the inner case 2 that vibrates in accordance with the external vibration and the tabular member 7 do not vibrate in the same mode. With this, shear deformation occurs in the filler 6 disposed between the inner case and the tabular member, and the vibration can be damped by the viscoelastic damping effect. The effect of the shear deformation is enhanced as the acoustic impedance of the tabular member 7 is increased.

In order to efficiently generate energy loss by the viscoelasticity, it is preferable that the tabular member 7 is deformed as little as possible while the inner case 2 is deformed in the radial directions as shown in FIG. 3, that is, the rigidity of the tabular member (washer) 7 is greater than that of the inner case 2. This is because shear deformation occurring in the filler 6 interposed between the inner case 2 and the tabular member 7 generates energy loss by the viscoelastic damping effect, and can efficiently dissipate the vibration $V_R$ in the radial directions. When the rigidity of the tabular member 7 is less than that of the inner case 2, the tabular member vibrates in accordance with the shear deformation of the filler 6, and the efficiency of dissipating unwanted vibrational energy is insufficient. Therefore, the rigidity of the tabular member 7 is preferably greater than that of the vibrating inner case 2.

Moreover, the size of the tabular member 7 is preferably greater than that of the piezoelectric element 3. In an ultrasonic sensor including a cylindrical case with a bottom and a piezoelectric element 3 disposed on the inner side of the bottom so as to define a vibrating surface, the piezoelectric element has an optimum size in order to obtain characteristics, such as wave transmitting sensitivity and wave receiving sensitivity, based on the distribution of vibration on the vibrating surface and the electromechanical coupling coefficient when the vibrating surface to which the piezoelectric element is bonded is included. On the other hand, the strength and the frequency, for example, of vibration that causes reverberation vary in accordance with the designed dimensions and the material, for example, of the case, and the vibration is preferably dissipated as much as possible such that unwanted vibration is prevented. For this reason, it is necessary to efficiently dissipate the mechanical energy between the tabular member disposed at the side opposite to that of the piezoelectric element and the filler. However, when the size of the tabular member is less than that of the piezoelectric element, a sufficient mechanical damping function cannot always be achieved. Accordingly, the size of the tabular member 7 is preferably greater than that of the piezoelectric element 3.

The viscosity of the filler 6 before curing preferably ranges from about 1 Pa·s to about 1,000 Pa·s, for example. A filler having a viscosity in this range can effectively provide the effect of damping mechanical energy in the viscous body since the propagation speed of transverse waves transmitted on the medium is relatively low. A filler having a viscosity that is too high is not preferable because of the reduced filling work efficiency and the difficulty in handling. In contrast, a filler having a viscosity that is too low is not preferable since the damping effect is insufficient.

Figure 4A:
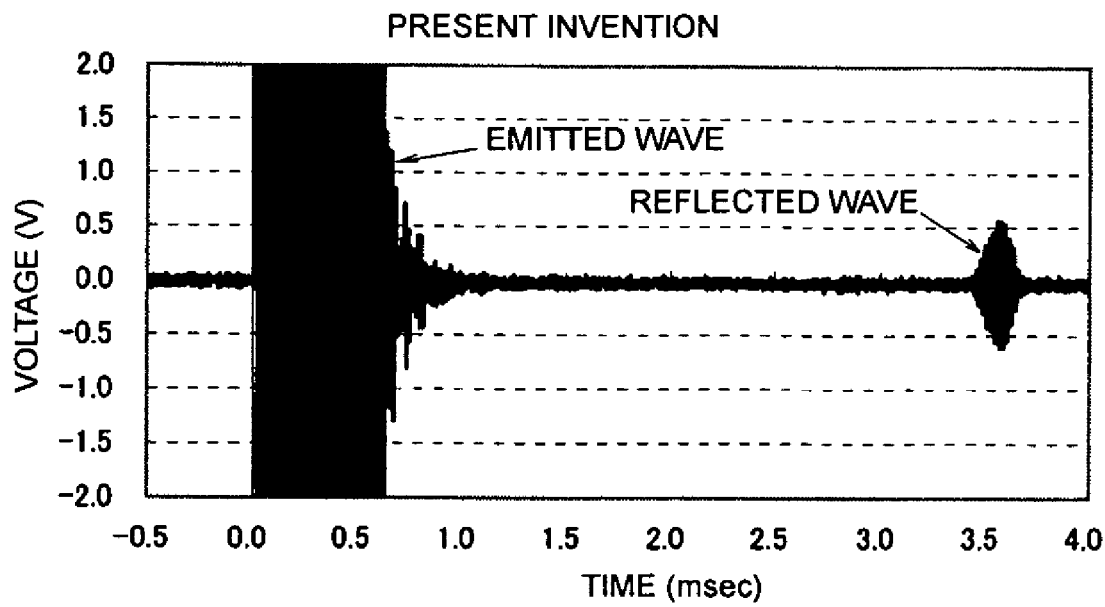
FIGS. 4A and 4B illustrate the reverberation characteristic of the ultrasonic sensor of according to the preferred embodiment of the present invention shown in FIG. 1 and that of an ultrasonic sensor of Comparative Example, respectively, for comparison.
Figure 4B:
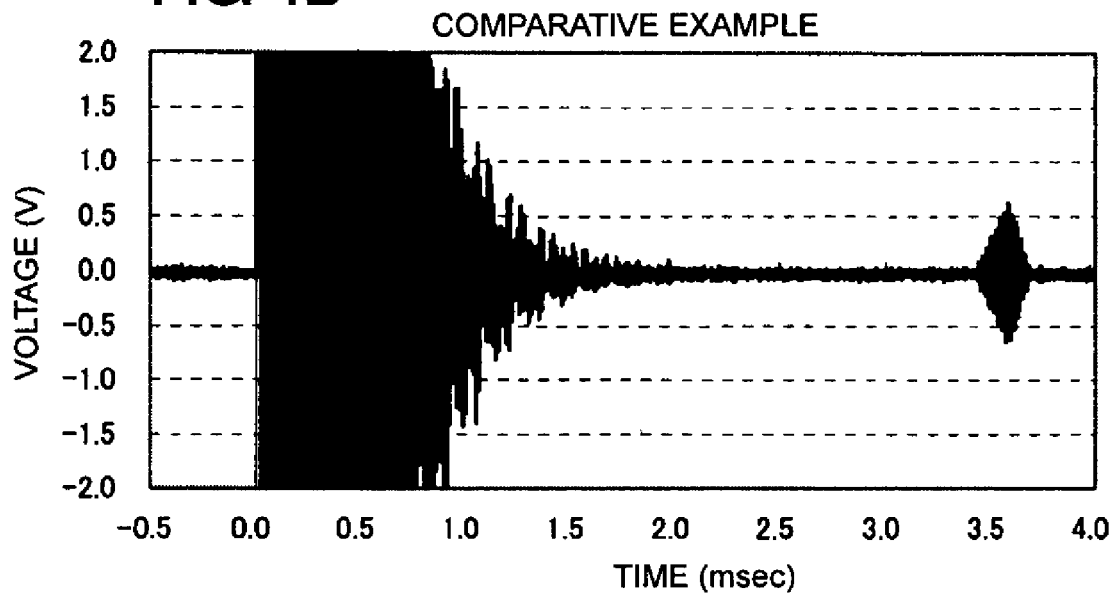
Figure 15:
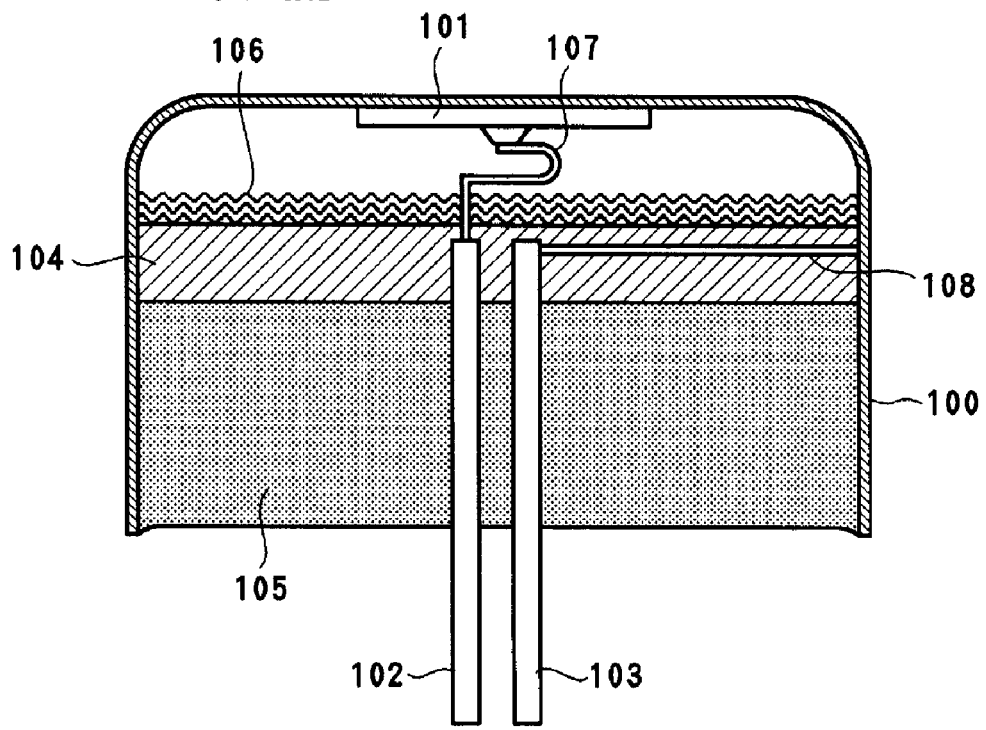
FIG. 15 is a cross-sectional view of an ultrasonic sensor with a known structure.
Figure 16:
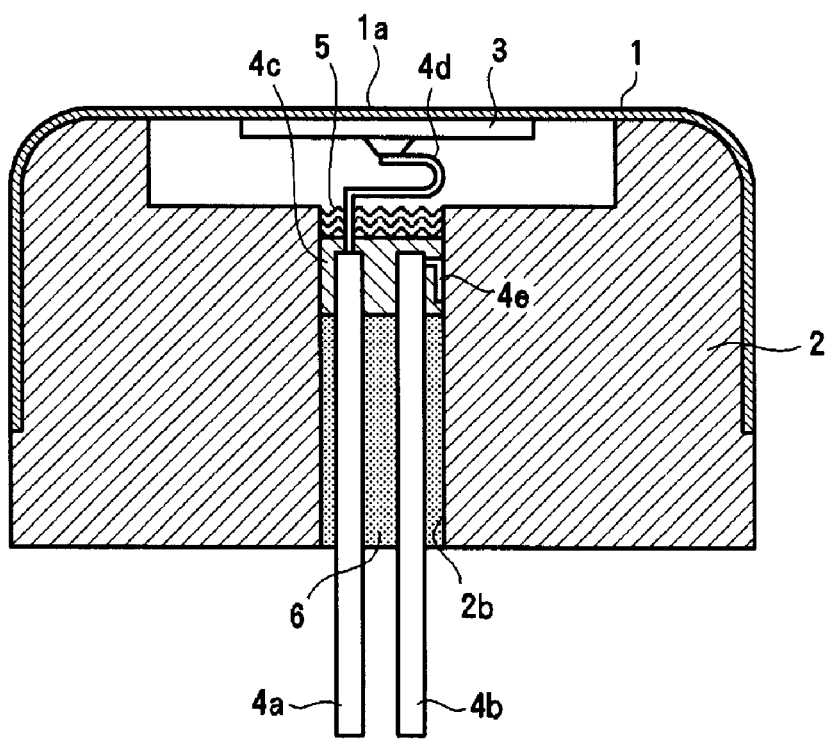
FIG. 16 is a cross-sectional view of the ultrasonic sensor of a Comparative Example.

FIG. 4A illustrates the reverberation characteristic of the ultrasonic sensor A of the preferred embodiment shown in FIG. 1, and FIG. 4B illustrates the reverberation characteristic of an ultrasonic sensor of Comparative Example shown in FIG. 16. In the drawings, the waveform of an emitted wave is shown at the left side, and the waveform of a wave reflected from an object is shown at the right side. The ultrasonic sensor of Comparative Example has substantially the same structure as that of the ultrasonic sensor A shown in FIG. 1 except that the recessed portion 2c of the inner case 2 adjacent to the rear side and the tabular member 7 are omitted. Since the structure other than this is substantially the same as that shown in FIG. 1, the same reference numbers are used for the same components, and the duplicated descriptions will be omitted. Herein, the diameter of the sensor was about 15.5 mm, the height was about 9 mm, the thickness of the tabular member 7 was about 1.6 mm, and the diameter of the recessed portion 2c was about 12 mm, for example. Although the ultrasonic sensor of Comparative Example could also reduce the duration of the reverberation signal of the emitted wave to some extent by the damping effect of the thick inner case 2 in a similarly manner as the known ultrasonic sensor (see FIG. 15), as is clear from FIGS. 4A and 4B, the ultrasonic sensor A further reduced the duration of the reverberation signal of the emitted wave by the effect of the filler 6 disposed between the inner case 2 and the tabular member 7 as compared to that of Comparative Example, and could achieve outstanding results. From the results, the effectiveness of the viscoelastic damping effect caused by the shear deformation occurring in the filler has been confirmed.

FIGS. 5A and 5B illustrate the relationship between the thickness of the tabular member 7 and the reverberation tail. Herein, the diameter of the recessed portion 2c was about 12 mm, and the thickness of the recessed portion 2c was about 2.0 mm, for example. The reverberation tail refers to a signal level (amplitude) of the waveform of reverberation persisting even after the input signal of an applied sensor driving voltage is cut off. Herein, the reverberation tail was evaluated from the maximum and minimum values of the signal level after a measurement time of about 1.2 msec, for example. The signal level is preferably as low as possible. When the ultrasonic sensor was not provided with the tabular member (thickness=0 mm), the average of the reverberation tail was about 1.019 Vpp, and varied widely. In contrast, when the ultrasonic sensor was provided with the tabular member, the reverberation tail was reduced, and could be further reduced as the thickness of the tabular member was increased. In particular, when the thickness of the tabular member exceeded about 1.0 mm, the reverberation tail was reduced to about 0.1 Vpp or less, and the variations were small. In this manner, outstanding results were obtained.

Second Preferred Embodiment

FIG. 6 illustrates an ultrasonic sensor according to a second preferred embodiment of the present invention. In the ultrasonic sensor B, the entire rear surface of an inner case 2A defines the flat or substantially flat portion 2d, and the tabular member 7 is disposed on the flat or substantially flat portion 2d so as to face the flat or substantially flat portion with the filler 6 interposed therebetween. The outer diameter of the tabular member 7 is substantially the same as that of the inner case 2A. The same reference numbers are used for components common to those in the first preferred embodiment, and the duplicated descriptions will be omitted.

In this preferred embodiment, the areas of the inner case 2A and the tabular member 7 facing each other can be increased toward the outer peripheries thereof as compared to those in first preferred embodiment. Therefore, shear deformation can act on the filler 6 more effectively. That is, since the deformation of the outer peripheral portion of the flat or substantially flat portion 2d of the inner case 2A is greater than that of the inner peripheral portion, the amount of shear deformation of the filler 6 located between the outer peripheral portion of the flat or substantially flat portion 2d and the outer peripheral portion of the tabular member 7 is relatively large, and the viscoelastic damping effect can be more pronounced.

Third Preferred Embodiment

Figure 7:
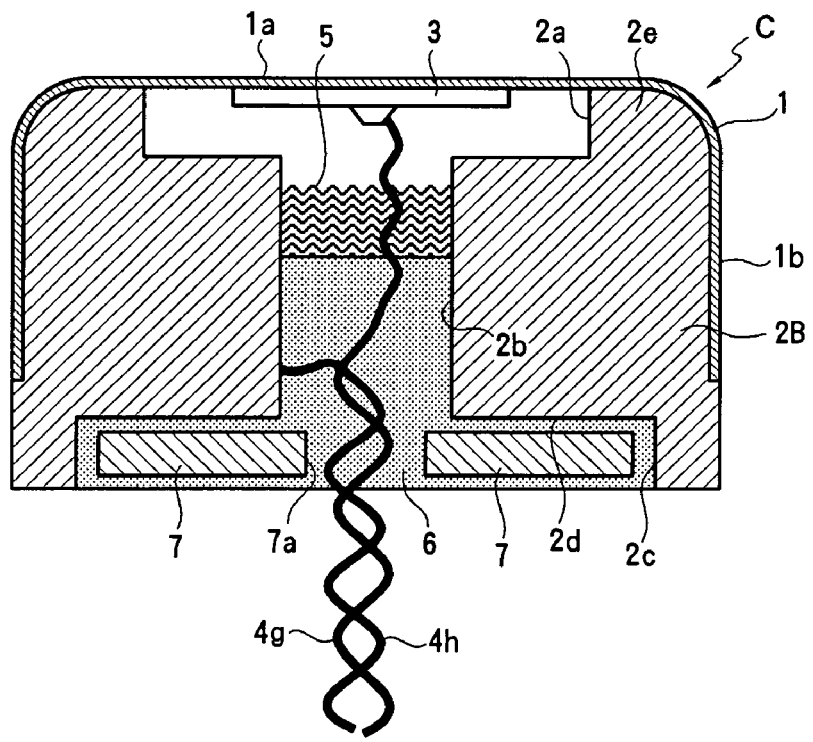
FIG. 7 is a cross-sectional view of an ultrasonic sensor according to another preferred embodiment of the present invention.

FIG. 7 illustrates an ultrasonic sensor according to a third preferred embodiment of the present invention. The same reference numbers are used for components common to those in the first preferred embodiment, and the duplicated descriptions will be omitted. In an ultrasonic sensor C of this preferred embodiment, a lead wire 4g is connected to the rear surface of the piezoelectric element 3 bonded to the inner side of the bottom portion 1a of the outer case 1, and another lead wire 4h is connected to the inner surface of the central hole 2b of an inner case 2B. These lead wires 4g and 4h extend to the exterior via the central hole 2b and the through-hole 7a of the tabular member 7. In addition, the tabular member 7 is disposed in the recessed portion 2c provided in the rear surface of the inner case 2B, and the filler 6 is interposed between the flat or substantially flat portion 2d defining the bottom surface of the recessed portion 2c and the tabular member 7. When the inner case 2B vibrates, relative deformation occurs between the inner case and the tabular member 7, and causes shear deformation in the filler 6 interposed therebetween. In this manner, the viscoelastic damping effect can be obtained.

Fourth Preferred Embodiment

Figure 8:
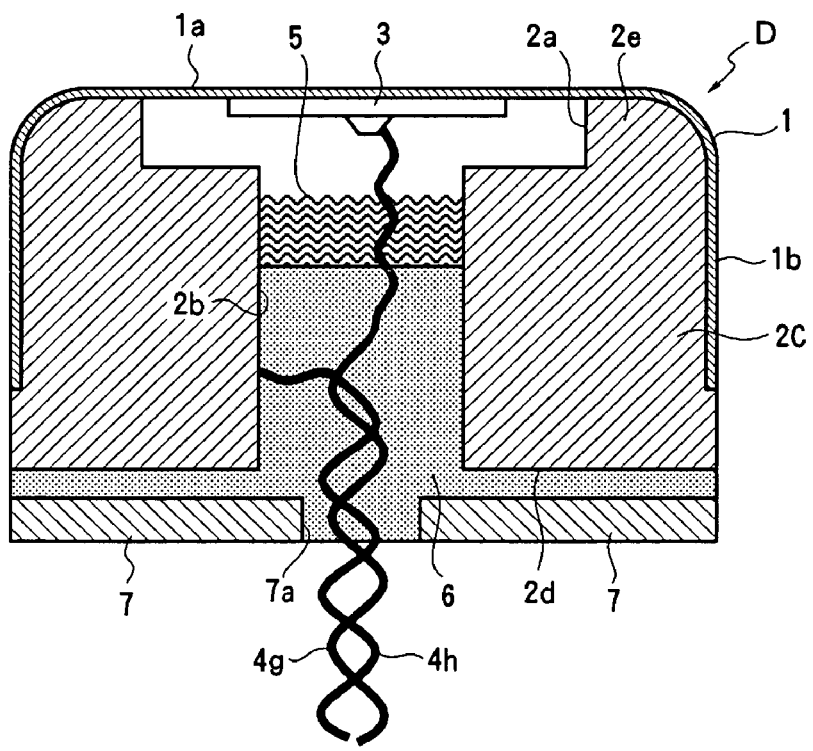
FIG. 8 is a cross-sectional view of an ultrasonic sensor according to another preferred embodiment of the present invention.

FIG. 8 illustrates an ultrasonic sensor according to a fourth preferred embodiment of the present invention. The same reference numbers are used for components common to those in third preferred embodiment, and the duplicated descriptions will be omitted. This ultrasonic sensor D is a modification of the ultrasonic sensor C of third preferred embodiment. The entire rear surface of an inner case 2C defines the flat or substantially flat portion 2d, and the tabular member 7 is disposed on the flat or substantially flat portion 2d so as to face the flat or substantially flat portion with the filler 6 interposed therebetween. The outer diameter of the tabular member 7 is substantially the same as that of the inner case 2C. In this preferred embodiment, the areas of the inner case 2C and the tabular member 7 facing each other can be increased as in the second preferred embodiment. Therefore, shear deformation can act on the filler 6 more effectively.

Fifth Preferred Embodiment

Figure 9:
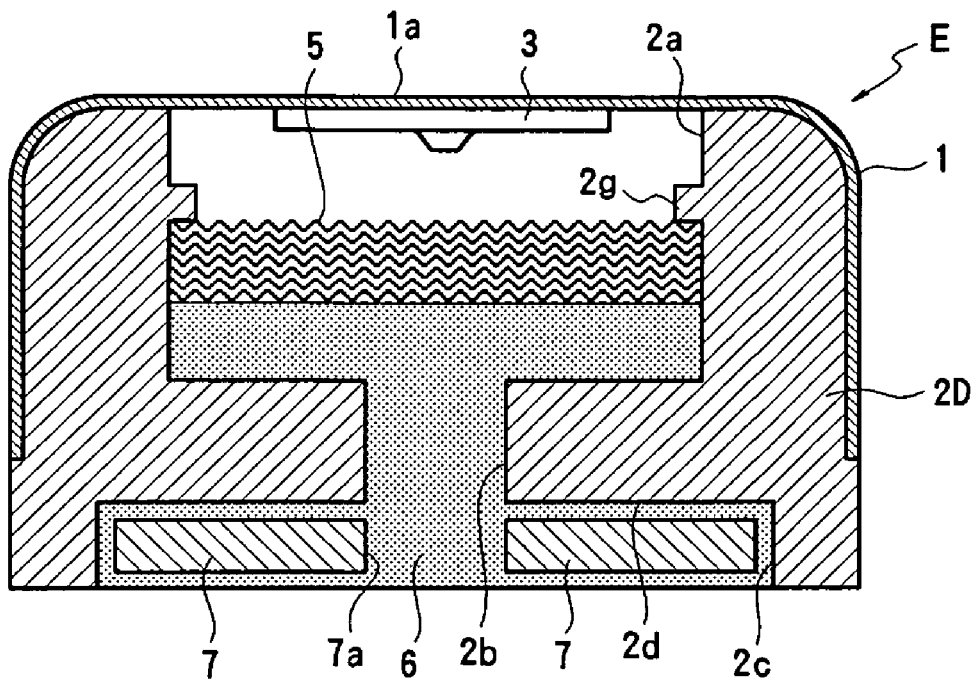
FIG. 9 is a cross-sectional view of an ultrasonic sensor according to another preferred embodiment of the present invention.

FIG. 9 illustrates an ultrasonic sensor according to a fifth preferred embodiment of the present invention. The same reference numbers are used for components common to those in the first preferred embodiment, and the duplicated descriptions will be omitted. In an ultrasonic sensor E of this preferred embodiment, the recessed portion 2a of an inner case 2D adjacent to the front side is deeper that in the first preferred embodiment, the sound wave absorber 5 is disposed in the recessed portion, and a portion of the filler 6 is disposed in the recessed portion 2a. An inner circumferential projection 2g arranged to position the front surface of the sound absorber 5 such that the sound absorber 5 is not brought into contact with the piezoelectric element 2 is provided on the inner surface of the recessed portion 2a. The recessed portion 2c is provided in the inner case 2D at a location adjacent to the rear side, and the tabular member 7 is disposed on the flat or substantially flat portion 2d defining the bottom surface of the recessed portion 2c so as to face the flat or substantially flat portion 2d with the filler 6 interposed therebetween. Although no connecting terminals to apply electrical signals to the piezoelectric element 3 and to extract output signals are illustrated in FIG. 9, metallic terminals as shown in the first and second preferred embodiments or lead wires as shown in the third and fourth preferred embodiments can preferably be used as the connecting terminals.

Sixth Preferred Embodiment

Figure 10:
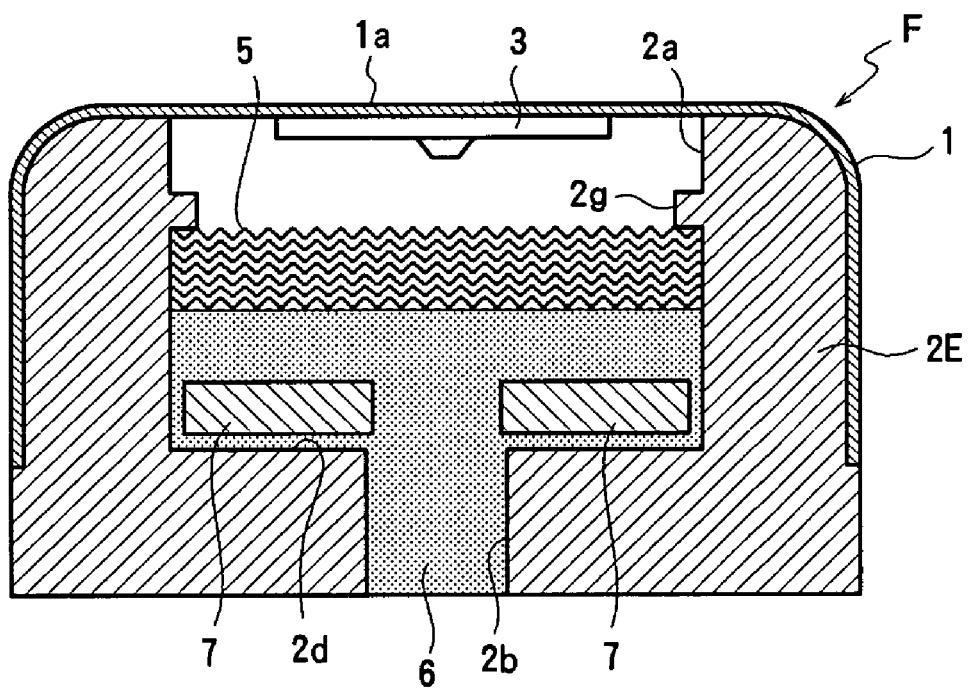
FIG. 10 is a cross-sectional view of an ultrasonic sensor according to another preferred embodiment of the present invention.

FIG. 10 illustrates an ultrasonic sensor according to a sixth preferred embodiment of the present invention. The same reference numbers are used for components common to those in the fifth preferred embodiment, and the duplicated descriptions will be omitted. In an ultrasonic sensor F of this preferred embodiment, the recessed portion 2a of an inner case 2E adjacent to the front side (adjacent to the piezoelectric element) is deeper that in the first preferred embodiment, the sound wave absorber 5 is disposed in the recessed portion, and a portion of the filler 6 is disposed in the recessed portion 2a as in the fifth preferred embodiment. The bottom surface of the recessed portion 2a defines the flat or substantially flat portion 2d, and the tabular member 7 is disposed on the flat or substantially flat portion 2d so as to face the flat or substantially flat portion 2d with the filler 6 interposed therebetween.

In this preferred embodiment, the flat or substantially flat portion 2d is provided in the inner case 2E at a location adjacent to the front side (adjacent to the piezoelectric element), and the tabular member 7 is disposed at a side of the flat or substantially flat portion 2d adjacent to the front side. That is, the tabular member 7 is completely disposed in the case (outer case 1 and the inner case 2E), and is advantageously less susceptible to heat or outside air. Although no connecting terminals to apply electrical signals to the piezoelectric element 3 and to extract output signals are illustrated in FIG. 10, metallic terminals as shown in the first and second preferred embodiments or lead wires as shown in the third and fourth preferred embodiments can preferably be used as the connecting terminals.

Seventh Preferred Embodiment

Figure 11:
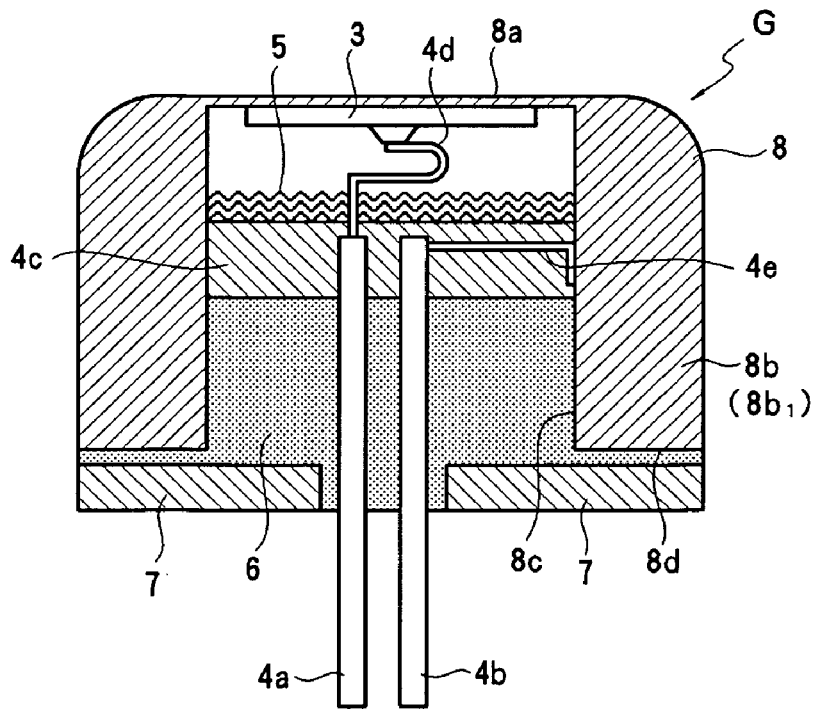
FIG. 11 is a cross-sectional view of an ultrasonic sensor according to another preferred embodiment of the present invention.
Figure 12:
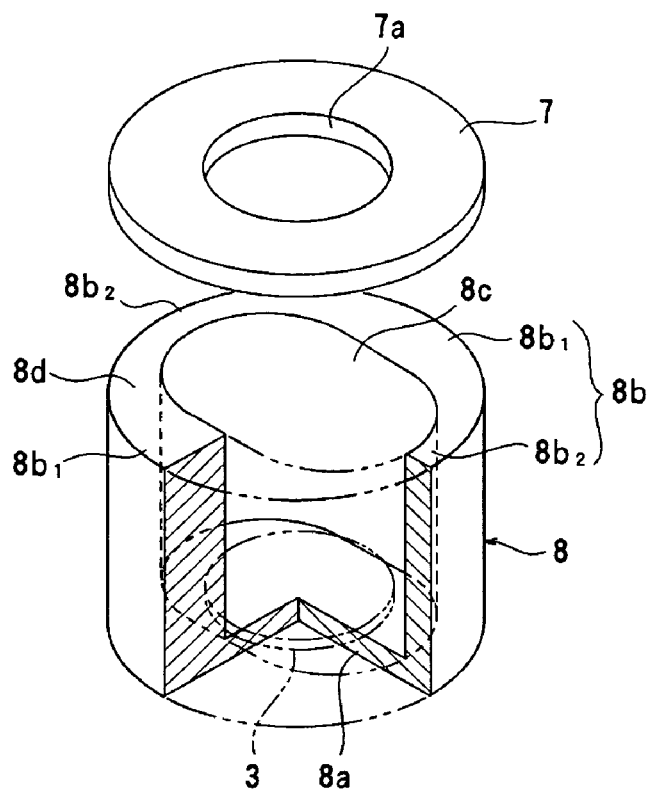
FIG. 12 is a perspective view of a case of the ultrasonic sensor and a tabular member shown in FIG. 11.
Figure 13:
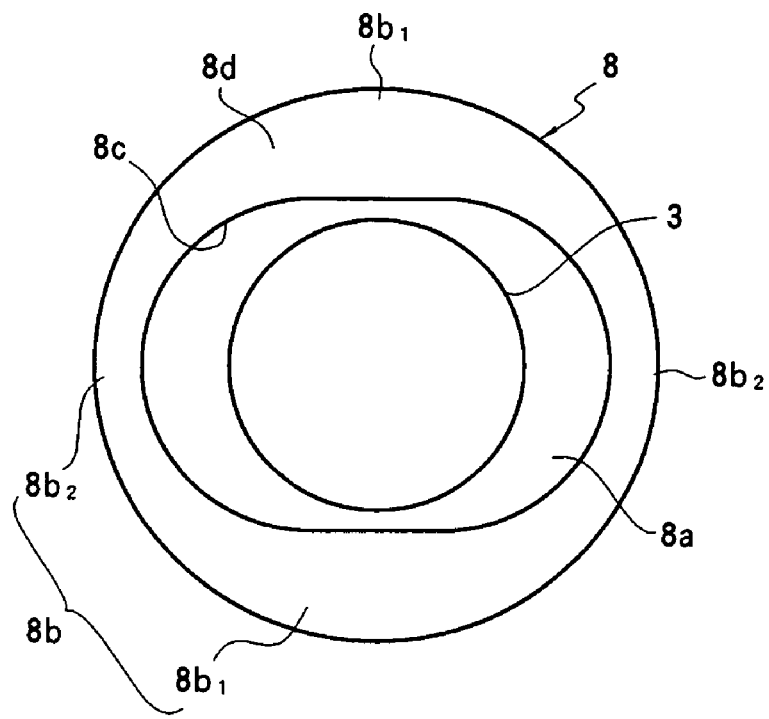
FIG. 13 is a rear view of the case of the ultrasonic sensor shown in FIG. 11 without the tabular member.

FIGS. 11 to 13 illustrate an ultrasonic sensor according to a seventh preferred embodiment of the present invention. The same reference numbers are used for components common to those in the first preferred embodiment, and the duplicated descriptions will be omitted. An ultrasonic sensor G in this preferred embodiment includes a case 8 into which an outer case and an inner case made of the same material are integrated. The front surface of the piezoelectric element 3 is bonded to the inner side of a bottom portion 8a of the case 8. The spring terminal 4d attached to an end of the metallic terminal 4a is connected to the rear surface of the piezoelectric element 3, and the spring terminal 4e of the metallic terminal 4b is connected to the inner surface of a central hole 8c of the case 8. The metallic terminals 4a and 4b extend to the exterior via the central hole 8c and the through-hole 7a of the tabular member 7. The piezoelectric element 3 is not limited to be disc-shaped, and can be substantially elliptic or substantially rectangular, for example.

In this preferred embodiment, the central hole 8c of the case 8 preferably has an elliptical or substantially elliptical shape with a bottom. Since the outside shape of the case 8 is cylindrical or substantially cylindrical, a sidewall portion (inner support) 8b of the case 8 includes thick portions 8$b_1$ and thin portions 8$b_2$. A flat or substantially flat portion 8d is provided at the end surface of the sidewall portion 8b of the case 8, and the tabular member 7 whose outer diameter is substantially the same as that of the case 8 is disposed on the flat or substantially flat portion 8d so as to face the flat or substantially flat portion 8d with the filler 6 interposed therebetween. In this preferred embodiment, the areas of the case and the tabular member 7 facing each other are ensured due to the thick portions 8$b_1$.

In this preferred embodiment, the case 8 includes the outer case and the inner case integrated with each other, and is susceptible to reverberation since the entire case is made of a material with a relatively low acoustic impedance. However, when the sidewall portion 8b of the integrated case 8 vibrates, relative deformation occurs between the flat or substantially flat portion 8d and the tabular member 7 due to the filler 6 interposed between the flat or substantially flat portion 8d provided on the rear surface of the integrated case 8 and the tabular member 7, and causes shear deformation in the filler 6 interposed therebetween. In this manner, the viscoelastic damping effect can be obtained. Moreover, the integration of the outer case and the inner case can advantageously reduce the production cost.

Eighth Preferred Embodiment

Figure 14:
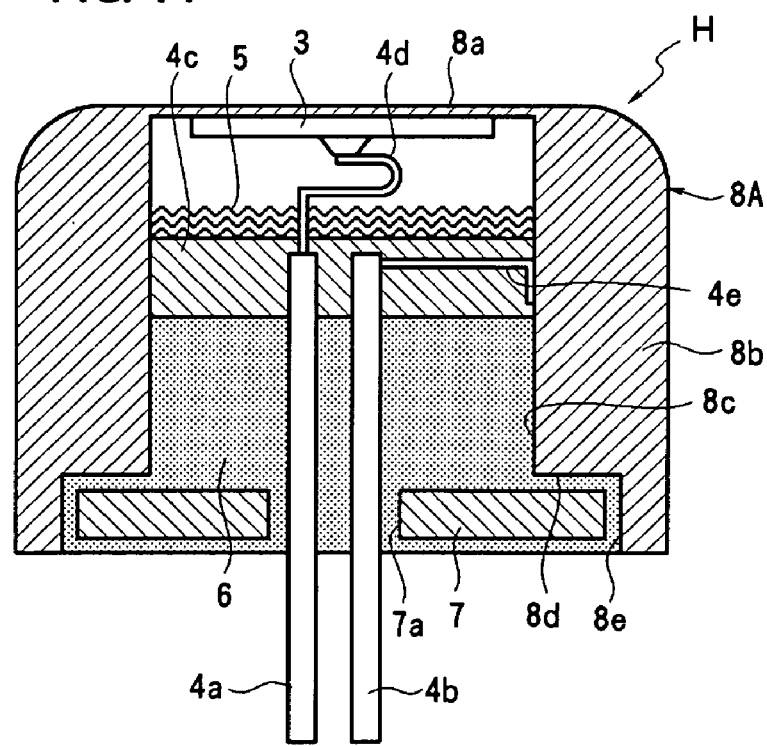
FIG. 14 is a cross-sectional view of an ultrasonic sensor according to another preferred embodiment of the present invention.

FIG. 14 illustrates an ultrasonic sensor according to an eighth preferred embodiment of the present invention. The same reference numbers are used for components common to those in the seventh preferred embodiment, and the duplicated descriptions will be omitted. An ultrasonic sensor H also includes an integrated case 8A including an outer case and an inner case made of the same material integrated together. The ultrasonic sensor H differs from the ultrasonic sensor G of seventh preferred embodiment in that a recessed portion 8e provided in the integrated case 8A at a location adjacent to the rear side and the tabular member 7 is disposed inside the recessed portion 8e. The tabular member 7 is covered with the filler 6. When the integrated case 8A vibrates, relative deformation occurs between the flat or substantially flat portion 8d and the tabular member 7 due to the filler 6 interposed between the flat or substantially flat portion 8d defining the bottom surface of the recessed portion 8e and the tabular member 7, and causes shear deformation in the filler 6 interposed therebetween. In this manner, the viscoelastic damping effect is obtained. As in the seventh preferred embodiment, the case 8A having the integrated structure can advantageously reduce the production cost.

In the above-described preferred embodiments, the inner case preferably has a ring shape or a cylindrical shape, and the tabular member preferably has a disc shape. However, the case can have a rectangular tube shape, and the tabular member can have a rectangular plate shape, for example. The flat or substantially flat portion provided in the inner case (inner support) does not necessarily have a smooth surface, and can have an uneven surface. Similarly, the surface of the tabular member is not necessarily smooth, and can be uneven. Moreover, the flat or substantially flat portion is not necessarily parallel or substantially parallel to the bottom portion defining the vibrating surface, and can be, for example, inclined with respect to the bottom portion or curved as long as the flat or substantially flat portion can cause shear deformation in the filler when the inner support vibrates. In this case, it is preferable that the surface of the tabular member facing the flat or substantially flat portion is substantially parallel to the flat or substantially flat portion, that is, the thickness of the filler interposed between the flat or substantially flat portion and the tabular member is substantially uniform. Furthermore, the central hole and the flat or substantially flat portion are not necessarily disposed in series, and can be separated from each other. In this case, the type of the filler disposed inside the central hole and that of the filler disposed on the flat or substantially flat portion can be different. Although a ring-shaped flat or substantially flat plate is used as the tabular member, a flat or substantially flat plate without a hole can also be used. The tabular member can have any shape, for example, a cap shape that covers the inner case at a position adjacent to the rear side. Moreover, a plurality of tabular members can be stacked. Furthermore, the thickness of the tabular member is not necessarily uniform.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An ultrasonic sensor comprising:
   a case having a bottom portion and a sidewall portion and a piezoelectric element fixed to an inner side of the bottom portion, the bottom portion defining a vibrating surface;
   an inner support disposed inside the sidewall portion of the case, and having a central hole extending in an axial direction at a central portion of the support; a flat or substantially flat portion around the central hole;
   a viscoelastic filler disposed inside the central hole and on the flat or substantially flat portion of the inner support; and
   a tabular member having a rigidity greater than a rigidity of the filler and disposed on the flat or substantially flat portion of the inner support so as to face the flat or substantially flat portion with the filler interposed therebetween.

2. The ultrasonic sensor according to claim 1, wherein the flat or substantially flat portion is a surface that is parallel or substantially parallel to the bottom portion of the case.

3. The ultrasonic sensor according to claim 1, wherein the case includes an outer case with a bottom and an inner case connected to and fixed inside the outer case, and the inner case defines the inner support.

4. The ultrasonic sensor according to claim 3, wherein the inner case is made of a metallic material with a density greater than a density from which the outer case is made.

5. The ultrasonic sensor according to claim 3, wherein each of the inner and outer cases has a cylindrical or substantially cylindrical shape.

6. The ultrasonic sensor according to claim 1, wherein a recessed portion is provided in an end of the inner support opposite to an end adjacent to the piezoelectric element, the flat or substantially flat portion is provided at a bottom surface of the recessed portion, and the tabular member is disposed in the recessed portion.

7. The ultrasonic sensor according to claim 1, wherein only the flat or substantially flat portion is provided at an end of the inner support opposite to an end adjacent to the piezoelectric element, and a shape of an outer periphery of the tabular member is substantially the same as that of an outer periphery of the inner support.

8. The ultrasonic sensor according to claim 1, wherein a through-hole corresponding to the central hole of the inner support is provided in the central portion of the tabular member, and a connecting terminal connected to the piezoelectric element extends to an exterior through the central hole of the inner support and the through-hole of the tabular member in a non-contact manner.

9. The ultrasonic sensor according to claim 1, wherein the inner support is integrated into an inner side of the sidewall portion of the case.

10. The ultrasonic sensor according to claim 1, wherein the case has a cylindrical or substantially cylindrical shape.

11. The ultrasonic sensor according to claim 1, wherein the inner support has a ring or substantially ring shape.

* * * * *